March 27, 1962 P. H. LANDIS 3,027,552
ALARM APPARATUS FOR GAS TESTING, PARTICULARLY CARBON MONOXIDE
Filed Feb. 21, 1957

INVENTOR.
PETER H. LANDIS

ALARM APPARATUS FOR GAS TESTING,
PARTICULARLY CARBON MONOXIDE
Peter H. Landis, 142 Gulf Bldg., Pittsburgh, Pa.
Filed Feb. 21, 1957, Ser. No. 641,655
6 Claims. (Cl. 340—237)

This invention relates to alarm apparatus for gas testing and particularly to an improved alarm apparatus for the detection of carbon monoxide in an enclosed atmosphere. This application is a continuation-in-part of my copending application Serial No. 578,674, filed April 17, 1956 which application was abandoned after the filing of the instant application.

The primary object of this invention is to provide an improved alarm apparatus using a self-exhausting, light-affecting vapor or gas to indicate the presence of a particular constituent, particularly carbon monoxide, in an enclosed atmosphere such as homes, schools, and the like, which is accurate and reliable in physiologically significant very low concentrations and which can be made available for extensive residential use at a comparatively low cost.

Another object of the invention is to provide a new and improved alarm apparatus for the detection of carbon monoxide which does not require frequent replacement of the carbon monoxide sensitive substance, nor does it require reactivating of the carbon monoxide sensitive substance to carbon monoxide indicating condition after it has been exposed to carbon monoxide.

Another object of this invention is to provide an improved alarm apparatus for homes, schools, and the like which is inexpensive, easily manufactured and assembled, portable, efficient, reliable, and which requires a minimum of human attention and operates automatically.

A further object is to provide an improved alarm apparatus for the detection of carbon monoxide which maintains the carbon monoxide sensitive substance in a carbon monoxide indicating condition by a safe, simple, and comparatively inexpensive means.

The substance which is sensitive to carbon monoxide is iodine pentoxide, a fact that has been known for many years. However, the heating of iodine pentoxide to a temperature of approximately 175 to 200 degrees centigrade so as to react with carbon monoxide to release iodine vapor which upon being heated assumes a blue-black color that affects a photo-electric circuit is new and extraordinarily effective.

The great number of carbon monoxide fatalities yearly in homes witness the need of the apparatus provided by this invention which is fully automatic, accurate, requires a minimum of human attention, in addition to being comparatively inexpensive, thereby being suitable for extensive residential use. The deciding factors for the lack of carbon monoxide alarms in homes are primarily the high cost of present apparatus and reagent replacements, the fact that tthe carbon monoxide sensitive substance of present apparatus deteriorates when exposed to a continuous flow of air, thereby necessitating frequent replacement and a great deal of attention, and the fact that they are bulky, complicated and therefore not adapted for residential use.

Carbon monoxide is a colorless, odorless, and tasteless gas which is recognized as a perpetual domestic and industrial hazard. The danger from carbon monoxide lies in the fact that even very low concentrations may cause serious injury. A person exposed to concentrations of 0.02 percent of carbon monoxide or 2 parts carbon monoxide in 10,000 parts of air will show symptoms after two hours of exposure; concentrations of 0.04 percent or 4 parts carbon monoxide in 10,000 parts of air will show symptoms after an hour of exposure; concentrations of 0.06 percent or 6 parts carbon monoxide in 10,000 parts air will show symptoms in about an hour of exposure; concentrations of 0.10 percent or 10 parts carbon monoxide in 10,000 parts of air may prove dangerous in an hour of exposure; and concentrations of 0.30 percent or 30 parts carbon monoxide in 10,000 parts of air will prove fatal in less than an hour of exposure. Prolonged exposure to very low concentrations of carbon monoxide may cause degenerative changes in the human body; of special interest in connection with carbon monoxide poisoning are the methods for the detection of carbon monoxide in very low concentrations of physiological significance, that is, from 2 parts carbon monoxide in 10,000 parts of air to concentrations of 10 to 30 parts carbon monoxide in 10,000 parts of air. Minute amounts of carbon monoxide in air up to 0.10 percent or 10 parts carbon monoxide in 10,000 parts of air can not be determined accurately by the oxidation of carbon monoxide in the presence of a catalyst because other carbon-containing gases or minute particles passing through a filter may be present in sufficient amounts to interfere.

Various types of alarm apparatus have been proposed for the detection of carbon monoxide. Alarm apparatus which depend for the detection of carbon monoxide on means of dry oxidation of free oxygen by metallic oxides as catalyst, and other alarm apparatus which depend for the detection of carbon monoxide on the color change from the reaction of carbon monoxide with the "National Bureau of Standards colorimetric carbon monoxide indicating gel," or the reaction of carbon monoxide with chemical salts such as palladium chloride in solution have already become known. All of the apparatus of this type, with which I am familiar, are not adapted nor desirable for residential use because they present considerable disadvantages: the hitherto employed film impregnated in a solution of a metallic salt such as palladium chloride is not desirable nor practical for residential use either because of the bulky and complicated character of the apparatus, or because it requires considerable care and attention for its proper operation; furthermore, the palladium chloride impregnated film when exposed to a continuous flow of air, even in the absence of carbon monoxide, underwent a brownish discoloration which was likely to falsify the alarm, in view of the fact that in very low concentrations of carbon monoxide only a slight darkening of the film is produced; in addition it required frequent and costly replacements of the reagent.

Alarm apparatus employing the "National Bureau of Standards colorimetric carbon monoxide indicating gel" is not desirable nor practical for residential use because it requires considerable care and attention, and frequent and costly replacements of the indicating gel; in addition, the gel when exposed to a continuous flow of air deteriorated and underwent a color discoloration, even in the absence of carbon monoxide, which was likely to falsify the alarm.

Other alarm apparatus employing the aforementioned gel and additional structure for reactivating the sensitivity of the carbon monoxide indicating gel after an exposure to carbon monoxide are not safe nor practical, in addition to being more costly, for home use; the above apparatus employs an intermittent electric spark to generate oxides of nitrogen; this fact would make such apparatus dangerous for home use and would likely cause an explosion in the event of a gas leak in the home, even in the absence of carbon monoxide; furthermore, the indicating gel will function at a temperature range of 45 to 60 degrees centigrade; in the production of oxides of nitrogen by an electric spark, ozone is also produced which would interfere unless removed or prevented from coming in contact with the indicating gel; heating the ozone to a temperature of 150 degrees centigrade in order to eliminate it will also destroy the indicating gel; positive cooling means must be provided for a drop in the temperature from 150 to 60 degrees centigrade, involving additional cost for the apparatus.

The alarm apparatus which involves the determination of a very slight temperature increase of a catalytic agent is not suitable for extensive application in the home because such apparatus necessitated the use of expensive thermocoupling units; the catalytic agents are supplied to the carrier materials by means of a simple mixing or baking process; they penetrated very little into the carrier material, had no permanent adherence to them; and of far greater importance, such apparatus hardly reacted to physiologically significant and particularly dangerous very low concentrations of carbon monoxide; in addition, other combustible hydrocarbons present in the air and dust particles were liable to falsify the alarm; water and other vapors poisoned the catalyst necessitating frequent changes of the catalyst and dehydrating agents; the efficiency of a drying agent decreases gradually permitting moisture to pass through and poison the catalyst. Three percent of carbon dioxide would cause such apparatus to give a false alarm even in the absence of carbon monoxide; also such apparatus requires frequent zero adjustments.

The alarm apparatus in industrial use employing concentrated sulphuric acid and iodine pentoxide presents a serious hazard and it is not safe nor suitable for residential use, first, because of the bulky and complicated character of the apparatus, secondly, because it requires constant attention and care, and thirdly, because it presents the potential danger of fuming sulphuric acid.

I have invented a portable carbon monoxide alarm apparatus for extensive residential use which overcomes the aforementioned disadvantages of the prior apparatus by safe, simple, and inexpensive means and which is adapted to function automatically and accurately over long periods of time with a minimum of human attention. By employing an easily exhaustible vapor or gas as the carbon monoxide indicating means to affect a photoelectric circuit to operate the alarm, I avoid the necessity of the aforementioned frequent replacement of catalytic agents and chemical reagents, which if not carried out at proper intervals would give the home owner a false sense of security and if neglected prove fatal in an hour of need; I also avoid the danger of employing an intermittent electric spark as a means for reactivating the carbon monoxide sensitive substance which could lead to an explosion in the event of a gas leak in a home even in the absence of carbon monoxide. Another advantage of the apparatus of this invention is that a simple, inexpensive means is provided to maintain the carbon monoxide sensitive substance in condition to react with carbon monoxide. By employing one substance which is sensitive to carbon monoxide, but a different substance or a vapor to indicate the presence of carbon monoxide and be self-exhausting, I avoid the need of replacements shown and the danger of using an electric spark. Another advantage of this invention is that the chemical substance, iodine pentoxide, may be used repeatedly to react with carbon monoxide to liberate iodine vapor to affect a photo-electric circuit without requiring a fresh supply or replacement until the iodine pentoxide is depleted after many alarms have been given. The apparatus of this invention is effective in low concentrations of carbon monoxide, it is safe and simple in its construction and arrangement, it is low in cost of manufacture and maintenance, it is portable, reliable and accurate, and readily assembled.

Although iodine pentoxide is a hygroscopic solid, it will react chemically with carbon monoxide to liberate iodine in the presence of fuming or concentrated sulphuric acid or when heated to about 150 degrees centigrade, provided that water vapor is first removed by means of a drying agent. Interfering gases such as hydrogen sulphide, sulphur dioxide, ethylene, and hydrogen are not normally found in a residential area, or if present, they are not of sufficient concentration to interfere.

In view of the fact that fuming sulphuric acid presents a health hazard and thereby is undesirable as a reagent for a carbon monoxide alarm for residential use, I have found that when granular iodine pentoxide is heated to a temperature approximately 175 to 200 degrees centigrade, it will remain in its anhydrous state and in condition to react with carbon monoxide without the aid of sulphuric acid, and the disadvantageous results of water vapor will be avoided; in addition, at the above temperatures the released iodine vapor assumes a blue-black color affecting a photo-electric circuit, and the speed of the chemical reaction between carbon monoxide and the iodine pentoxide is considerably increased.

I provide a housing or supporting member; a canister having a thermostatically controlled heater mounted therein; a gas-permeable test unit, bearing iodine pentoxide, disposed in the canister adjacent to the heater and arranged in a manner to divide the space of the canister into upper and lower air chambers, means for directing a stream of air, which may contain carbon monoxide, into the lower air chamber; an intake conduit communicating with said means and lower air chamber of the canister; an exhaust having a light-transmitting section or areas and communicating with the upper air chamber of the canister; a photo-electric assembly which is affected by self-exhausting, blue-black iodine vapor evolved from the reaction of iodine pentoxide with carbon monoxide; and an indicating means or alarm operated by the relay of the photo-electric assembly.

In the foregoing general description, I have set out certain advantages, purposes, and objects of my invention. Other advantages, purposes, and objects will be apparent from a consideration of the following description and accompanying drawings in which FIGURE 1 is a longitudinal sectional view of the preferred embodiment of the apparatus provided by this invention.

Figure 1:
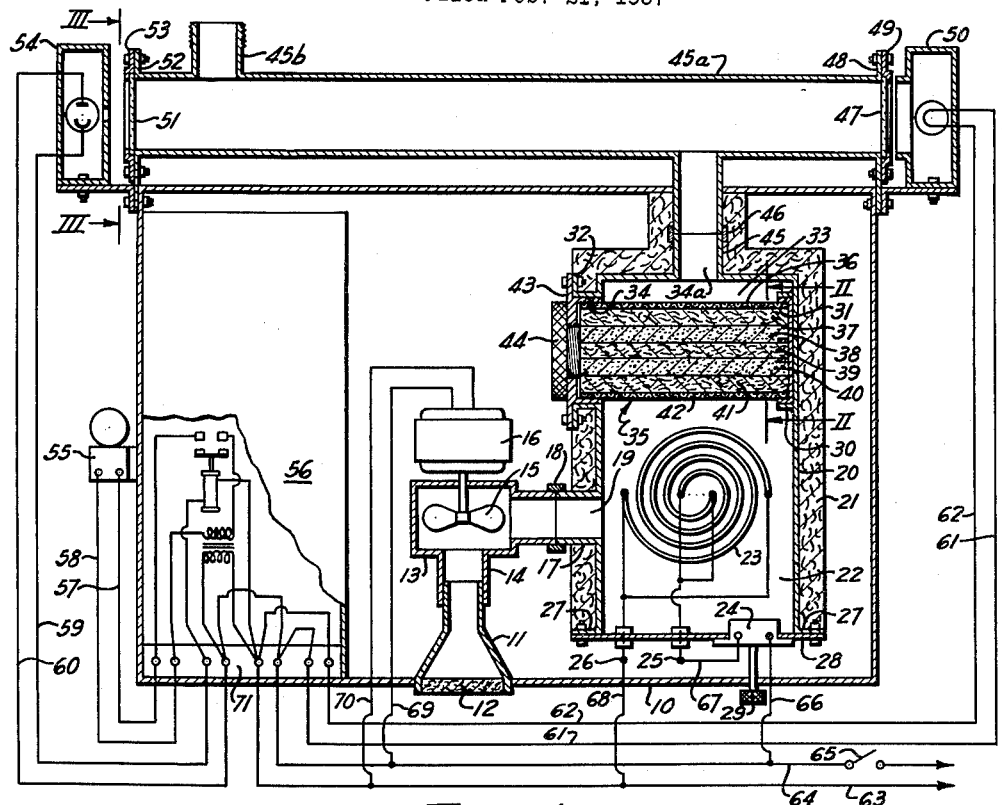
Figure 2:
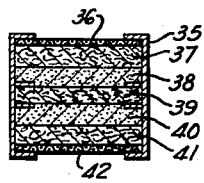
FIGURE 2 is a cross-sectional view of the gas-permeable test unit taken on line 2 of FIGURE 1.
Figure 3:
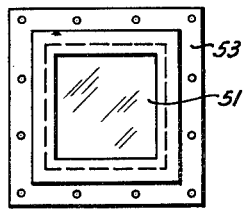
FIGURE 3 is a plan view of the exhaust closure plates illustrated in FIGURE 1.

Referring to the drawings, I have illustrated an enclosure 10 within which a blower or fan 15 is mounted in a housing 13 and operated by motor 16; the fan housing is provided with an intake 14 which terminates at its outer end in an enlarged funnel-shaped portion 11 which is exposed to the air to be tested; the opening of the funnel is provided with a filter 12 of low resistance to remove the dust from the indrawn air.

A canister 20 communicating with the fan housing 13 through aperture 19 and conduit 17 having a coupling 18 is provided with a lower open end having a flange 27 to which is mounted a removable cover 28; said cover having mounted thereon and arranged in said canister a heater 23 and a thermostat 24; air-tight junction of cover 28 and flange 27 is attained by means of a hi-temperature gasket and screws.

A gas-permeable test unit 35 having wire screens 36, 42 and supporting beds of iodine pentoxide 38 and 40 arranged therein alternately with gas-permeable filters 37, 39, 41 is disposed in canister 20 in a manner to divide said canister into an upper air chamber 33 which communicates with exhaust 45 through port 34a, and a lower air chamber 22; test unit 35 is snugly seated in the lateral tubular extension 34 and flanges 30 and 31 of canister 20.

Tubular extension 34 of canister 20 is provided with flange 32 to which is mounted flange 43 of test unit 35; air-tight junction of flanges 32 and 43 is attained in the aforementioned manner. For the purpose of replenishing the iodine pentoxide, the test unit is provided with handscrew 44; canister is enclosed in a sheath of insulating material 21.

Exhaust 45a having open ends is provided with flanges 48 and 52 to which are mounted closure plates 49 and 53 having transparent slides 47 and 51 respectively. Lamp 50 and photo-electric cell 54 are mounted adjacent to slides 47 and 51 respectively, in a manner that light from the lamp will be received by the photoelectric cell through the transparent slides 47 and 51 and exhaust 45a. Iodine vapor evolved from the reaction of iodine pentoxide with carbon monoxide, if present in exhaust 45a in a predetermined concentration, will reduce the amount of light received by the photoelectric cell from the lamp to operate an electronic relay 56 which in turn would operate the alarm means 55. The electronic relay may be of the type known as Worner Model 72 or Model 63B of the Worner Electronic Devices Corporation.

Referring to FIGURE 1, lamp 50 is supplied with electric current by conductors 61 and 62; conductors 63 and 64 having switch 65 supply power to the apparatus; terminals 25 and 26 of heater 23 having a thermostat 24 are supplied with power through conductors 66, 67 and 68; electronic relay 56 and motor 16 are supplied with electric current by conductors 63, 64 and 69, 70 respectively; photo-electric cell 54 and alarm 55 connecting to terminal strip 71 are supplied with electric current through conductors 59, 60 and 57, 58 respectively.

Air which may contain carbon monoxide is drawn into fan housing 13 by fan 15 and is forced through conduit 17 into lower air chamber 22 of canister 20 where it is heated to a temperature of approximately 175 to 200 degrees centigrade by the thermostatically controlled heater 23 arranged therein; the heated air in passing through the gas-permeable test unit comes in contact and the carbon monoxide present reacts with the iodine pentoxide to liberate a blue-black iodine vapor which passes through upper heated chamber 33 and hence through aperture 34a into conduit 45 and 45a to be exhausted to the outside atmosphere through exhaust conduit 45b. When the exhaustible, blue-black iodine vapor in conduit 45a is of a predetermined density, depending on the concentration of carbon monoxide present, to which the relay 56 is adjusted, it will reduce the amount of light received by the photo-electric cell from the lamp and through the iodine vapor to operate the relay 56 which in turn will operate the alarm. In the absence of carbon monoxide in the air tested, there will be no iodine vapor present in conduit 45a to interfere with the amount of light received by the photo-electric cell from the lamp and therefore there will be no alarm given as the photoelectric circuit continues to function.

From the above description, it is now apparent that the apparatus provided by this invention is adapted for residential use, it is extremely simple and compact, comparatively inexpensive, fully automatic, and it requires very little care and attention.

While the invention is susceptible to various modifications and alternative constructions to those I have shown in the drawings and herein described in detail the preferred embodiment, it is to be understood that my invention is not to be limited to the specific form or arrangement of parts herein shown and described.

I claim:

1. Gas testing apparatus for detecting the presence of a particular gas constituent in an enclosed gaseous atmosphere by the use of a self-exhausting, light-affecting vapor or gas which is evolved when said gas constituent is present, said apparatus comprising a canister; a gas-permeable test unit disposed therein; a body of iodine pentoxide, supported by said test unit, capable of reacting with said gas constituent to form an exhaustible vapor or gas which is evolved from the reaction of said iodine pentoxide with said constituent and which is capable of affecting the transmission of light; means for initiating and hastening the reaction between said iodine pentoxide and said constituent; a light-transmitting exhaust chamber communicating with said canister; a lamp introducing light into said chamber, a photo-electric cell arranged in a manner to receive light from the lamp through said exhaust chamber; an electronic relay which is operated by said photo-electric cell when light received by said cell drops to a predetermined value; means for passing said gaseous atmosphere through said canister and exhaust chamber; and indicating means operated by said relay.

2. Gas testing apparatus for detecting the presence of a particular constituent in an enclosed gaseous atmosphere by the use of a self-exhausting vapor as claimed in claim 1 wherein a heater is provided as the means for initiating and hastening the reaction and for maintaining in a sensitive condition said iodine pentoxide so as to react with said constituent.

3. Gas testing apparatus for detecting the presence of carbon monoxide in an enclosed gaseous atmosphere by the use of a self-exhausting, light-affecting iodine vapor which is evolved when said carbon monoxide is present, said apparatus comprising a canister; a gas-permeable test unit disposed therein; a body of iodine pentoxide, supported by said test cell, sensitive to carbon monoxide to form an exhaustible iodine vapor which is evolved from the reaction of said iodine pentoxide with said carbon monoxide and which is capable of affecting the transmission of light; means for maintaining said iodine pentoxide in a carbon monoxide sensitive condition; a light-transmitting exhaust chamber communicating with said canister; a lamp at the periphery of the exhaust chamber introducing light into the exhaust chamber, a photo-electric cell arranged in a manner to receive light from the lamp through said exhaust chamber; an electronic relay which is operated by said photo-electric cell when light received by said cell drops to a predetermined value; means for passing said gaseous atmosphere through said canister and chamber; and indicating means operated by said relay.

4. Gas testing apparatus for detecting the presence of carbon monoxide in an enclosed gaseous atmosphere by the use of a self-exhausting iodine vapor as claimed in claim 3 wherein a heater is provided to maintain said iodine pentoxide in a carbon monoxide sensitive condition to react with said carbon monoxide.

5. Gas testing apparatus for detecting the presence of carbon monoxide as claimed in claim 3 wherein a thermostatically controlled heater is provided to maintain a temperature range of approximately 175 to 200 degrees centigrade in said canister.

6. In a carbon monoxide alarm apparatus in combination, a canister having an intake aperture and an exhaust aperture, granular iodine pentoxide disposed therein in a manner to divide said canister into separate air chambers, a heater in said canister capable of maintaining said iodine pentoxide in its anhydrous state and causing it to react chemically with carbon monoxide in an atmosphere to produce iodine vapor effective in reducing a beam of light passing through said vapor, means for directing a stream of air into said canister through a communicating duct, an exhaust duct having transparent sections opposite each other, a light source positioned approximately at right angles to one of said transparent sections to direct a beam of light through that section, a photoelectric cell positioned approximately at right angles to the other transparent section in a manner to receive said light beam emanating from said light source and transmitted by said transparent section indicating means controlled by said photoelectric cell.

References Cited in the file of this patent

UNITED STATES PATENTS

| | | |
|---|---|---|
| 1,791,912 | Story | Feb. 10, 1931 |
| 2,549,974 | Klug | Apr. 24, 1951 |

(Other references on following page)

UNITED STATES PATENTS

| | | |
|---|---|---|
| 2,553,179 | Farr | May 15, 1951 |
| 2,668,284 | Mapes | Feb. 2, 1954 |
| 2,768,370 | Maninger | Oct. 23, 1956 |
| 2,773,349 | Bollo et al. | Dec. 11, 1956 |
| 2,787,782 | Rosenblum et al. | Apr. 2, 1957 |
| 2,876,364 | Goody | Mar. 3, 1959 |

FOREIGN PATENTS

| | | |
|---|---|---|
| 749,594 | Great Britain | May 30, 1956 |

OTHER REFERENCES

"Manual of Gas (Oil and Fuel) Analysis," Engelder, Wiley, 1931, page 93.

"The M.S.A. Carbon Monoxide Detector," 1936, Mine Safety Appliances Co.